UNITED STATES PATENT OFFICE.

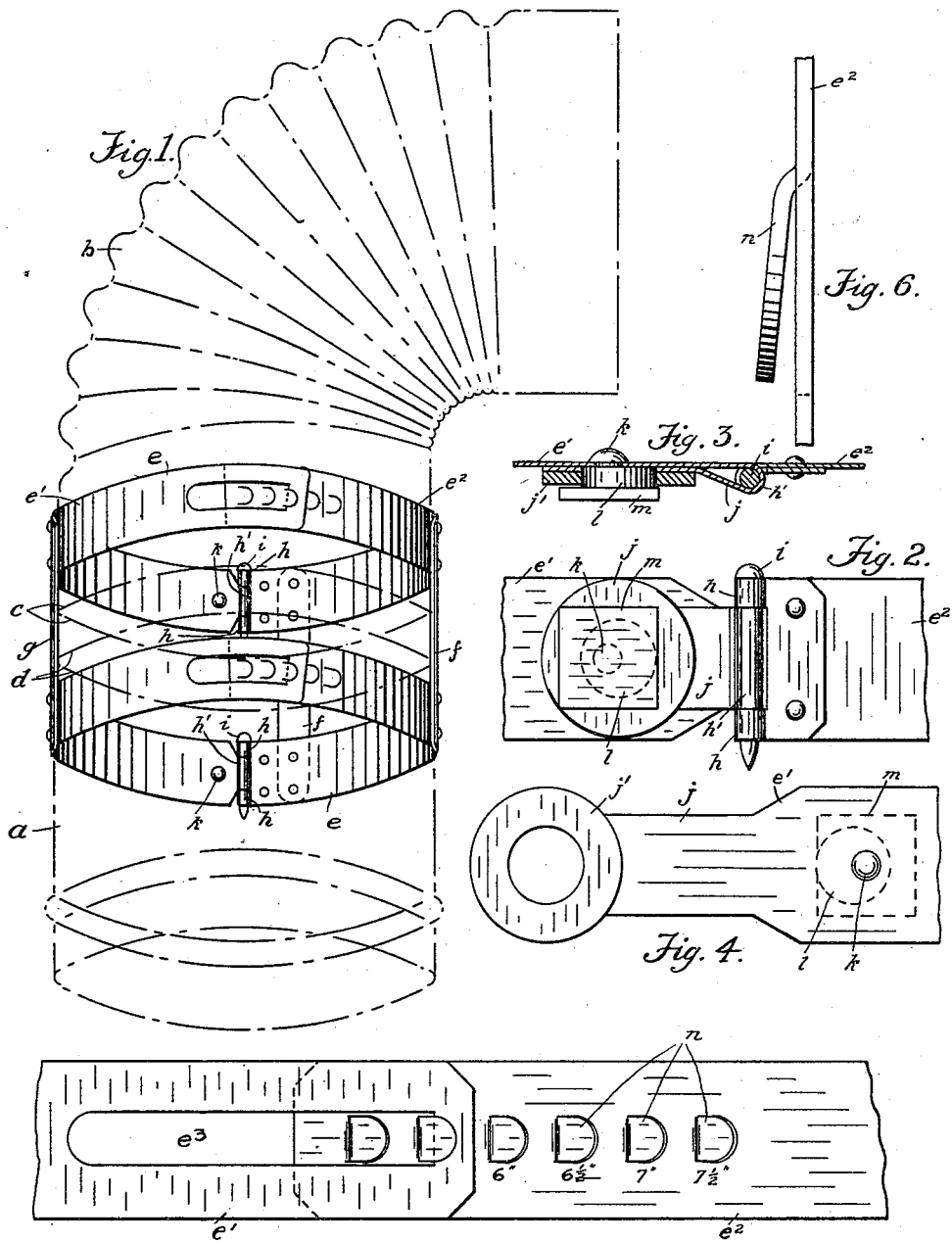

ANTON BLAHA, OF PORTLAND, OREGON, ASSIGNOR OF ONE-HALF TO TOLLEF O. SANDS, OF PORTLAND, OREGON.

LOCKING MEANS FOR JOINTS OF STOVEPIPES.

968,506. Specification of Letters Patent. Patented Aug. 23, 1910.

Application filed November 13, 1909. Serial No. 527,934.

*To all whom it may concern:*

Be it known that I, ANTON BLAHA, a citizen of the United States, and a resident of Portland, in the county of Multnomah and State of Oregon, have invented a new and useful Improvement in Locking Means for Joints of Stovepipes, of which the following is a specification, reference being had to the accompanying drawings, constituting a part thereof.

My invention has for its main object to provide easily applied means for securely holding the joints of stove-pipes together and thus avoiding the pulling of such pipe joints apart, as commonly occurs, and which condition not only prevents the proper draft through the pipes, but also fills the room with smoke and soot, and is liable to cause a fire from the sparks emitted.

Another object of my invention is to provide a contrivance which is cheap to manufacture and at the same time strong and durable, and which is adapted to be applied to any size pipe, and may be so applied without the aid of a skilled mechanic.

To this end my invention comprises two collars, tied together, one for each of the two pieces of the pipe, and overlapping ends provided with locking means adapted to permit the collar to be made larger or smaller to fit the pipe-piece and be clamped thereon.

These and other features are more fully explained in the body of the specification and illustrated in the drawings, in which:

Figure 1 shows my locking means applied for locking together an elbow joint and pipe length, as in practice, the pipe pieces being shown in dot-and-dash outline; Fig. 2 is a detail of the hinge-like joint by which two of the meeting ends of the collar members of my device are separably fastened together, and also shows means provided for tightening the collar about the pipe joint, so as to clamp it in place; Fig. 3 is a cross section through the center of Fig. 2; Fig. 4 shows an extended or straightened-out detail of the strap affixed in loop form to one of the members of the collars of my device, and which strap constitutes one of the knuckles of the hinge-fastening for the two meeting ends of the collar; this view also shows means, operating on the eccentric or cam principle, by which such hinged strap is shortened and lengthened, and in so doing the collar is clamped in place and released; Fig. 5 illustrates means for adjustably uniting the opposite two ends of the clamping bands of the collar of my device and by which the collars are adapted to fit pipes of varying diameter; and Fig. 6 is a top edge-view of that portion of the collar provided with the hook members of my device.

The pipe length $a$, and the pipe elbow $b$ (both shown in broken outline in Fig. 1) are provided with overlapping joint portions $c$, $d$, of the usual form of construction.

$e$, $e$, represent two collars or bands united at the sides by tie-straps $f$, $g$. Both collars are of identical construction. Each thereof comprises two parts $e'$, $e^2$, united at one of their meeting ends by a hinge-like joint (the details of which are more clearly shown in Fig. 2) consisting of knuckles $h$, $h$, formed on the collar member $e^2$, and a knuckle $h'$ formed on the strap end $j$, a part of the member $e'$; and through the knuckles is inserted a hinge pin $i$. A detail of the strap end $j$ of the member $e'$ is shown extended or straightened out in Fig. 4. It is reinforced on its extremity with a centrally perforated disk $j'$, adapted to be placed on the cam $l$, which is rotatably fastened on the collar member $e'$ by a riveted pin $k$, and the cam $l$ is provided with a wrench-head $m$.

In practice the strap $j$ is bent in the form of a loop (as shown in the sectional view Fig. 3) thus providing the hinge knuckle $h'$, and the cam $l$ would be inserted through the perforated disk $j'$ of the extremity of the strap $j$, and when so assembled the pin $k$ is headed to permanently hold the parts in place, as shown in Fig. 3.

The opposite ends of the members $e'$, $e^2$ of the collars overlap each other, and are provided with means for adjustably fastening the same together; that is to say, the collar member $e'$ is provided with a longitudinal slot $e^3$, and the collar member $e^2$ is provided with a series of hooks $n$, punched out from the metal, as shown in Figs. 5 and 6. Thus the collar may be adapted to fit a stovepipe of any cross section by simply overlapping the ends of the two members thereof and engaging the slotted end of the member $e^3$ with the relatively located hook $n$ of the member $e^2$. When so adjusting the collar, the cam $l$ is turned to such position as to give the strap $j$ its greatest length; and after the collar has been fitted, by means of a wrench applied to the wrench head m, the cam l is rotated in the opposite direction, thus drawing up and tightening the strap j, and causing the collar to be securely clamped in place.

As will be noted from Fig. 1, one of the collars e is fastened to one member of the pipe joint, as for example the elbow, and the other collar is fastened to the pipe length. When so fastened, it will be impossible for the pipe joints to become separated until either one of the collars has first been released by rotating the cam l of the strap j.

The construction of my device is further so contrived as to facilitate its convenient and ready removal in case such be required for the cleaning out of the pipes, or repair thereof. In order to release my device it is sufficient to rotate the cam head so as to lengthen the strap j, and therewith remove the tension of the knuckle member h' on the hinge-pin i, whereupon the latter may be withdrawn and the collar immediately removed.

For convenience of application the hooks n may be located so as to represent distances of half inches from each other, and correspondingly marked.

I claim:

1. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means adjustably securing the extremity of the strap end, the opposite ends of the two members of the collar overlapping, and being respectively provided with means by which they are adjustably fastened together.

2. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means, operating on the cam principle, adjustably securing the extremity of the strap end, the opposite ends of the two members of the collar overlapping, and being respectively provided with means by which they are adjustably fastened together.

3. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, the extremity of the strap end being provided with an annular aperture and the body of this collar member with a rotatable cam disk inserted through such aperture, the opposite ends of the two members of the collar overlapping, and being respectively provided with means by which they are adjustably fastened together.

4. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means adjustably securing the extremity of the strap end, the extremity of the strap end being provided with an annular aperture and the body of this collar member with a rotatable cam disk inserted through such aperture, and means on the cam disk facilitating the application thereto of and the rotation thereof by an instrument, the opposite ends of the two members of the collar overlapping, and being respectively provided with means by which they are adjustably fastened together.

5. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means adjustably securing the extremity of the strap end, the extremity of the strap end being provided with an annular aperture and the body of this collar member with a rotatable cam disk inserted through such aperture, a wrench-head on the cam disk, the opposite ends of the two members of the collar overlapping, and being respectively provided with means by which they are adjustably fastened together.

6. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means adjustably securing the extremity of the strap end, the opposite ends of the two members of the collar overlapping, and one of such ends being provided with a loop and the other with a series of hook-like engaging means.

7. Locking means for the joints of a pipe comprising two collars and tie-straps connecting the same, each collar comprising two parts or members, hinged knuckles on the ends of one member, a pin in said knuckles, a strap on the related end of the other member, such strap also constituting a knuckle and being looped around the hinged pin, means, operating on the cam principle, adjustably securing the extremity of the strap end, the opposite ends of the two members of the collar overlapping, and one of such ends being provided with a loop and the other with a series of hook-like engaging means.

8. Locking means for the joints of a pipe comprising two collars and tie-straps connecting the same, each collar comprising two members, hinged knuckles on the ends of one member, a pin in said knuckles, a strap on the related end of the other member, such strap also constituting a knuckle and being looped around the hinged pin, the extremity of the strap end being provided with an annular aperture and the body of this collar member with a rotatable cam disk inserted through such aperture, and means on the cam disk facilitating the application thereto of and the rotation thereof by an instrument, the opposite ends of the two members of the collar overlapping, and one of such ends being provided with a loop and the other with a series of hook-like engaging means.

ANTON BLAHA.

Witnesses:
   CECIL LONG,
   O. O. MARTIN.